US010333848B2

(12) United States Patent
Flajslik et al.

(10) Patent No.: US 10,333,848 B2
(45) Date of Patent: Jun. 25, 2019

(54) TECHNOLOGIES FOR ADAPTIVE ROUTING USING THROUGHPUT ESTIMATION

(71) Applicant: Intel Corporation, Santa Clara, CA (US)

(72) Inventors: Mario Flajslik, Hudson, MA (US); Eric R. Borch, Fort Collins, CO (US); Michael A. Parker, Santa Clara, CA (US); Scott S. Diesing, Round Rock, TX (US)

(73) Assignee: Intel Corporation, Santa Clara, CA (US)

(*) Notice: Subject to any disclaimer, the term of this patent is extended or adjusted under 35 U.S.C. 154(b) by 114 days.

(21) Appl. No.: 15/200,453

(22) Filed: Jul. 1, 2016

(65) Prior Publication Data
US 2018/0006945 A1 Jan. 4, 2018

(51) Int. Cl.
H04L 12/801 (2013.01)
H04L 12/26 (2006.01)
H04L 12/835 (2013.01)
H04L 12/935 (2013.01)

(52) U.S. Cl.
CPC ............ H04L 47/11 (2013.01); H04L 43/08 (2013.01); H04L 43/0888 (2013.01); H04L 47/30 (2013.01); H04L 49/3027 (2013.01)

(58) Field of Classification Search
CPC ....... H04Q 11/0005; H04Q 2011/0024; H04Q 2011/0052; H04L 47/10; H04L 47/11; H04L 49/70; H04L 49/15; H04L 43/0888; H04L 49/3027; H04L 43/08; H04L 47/30
See application file for complete search history.

(56) References Cited

U.S. PATENT DOCUMENTS

2015/0016266 A1* 1/2015 Dumitrescu .......... H04L 47/623 370/236
2016/0294729 A1* 10/2016 Musoll ................. H04L 49/103
2017/0289048 A1* 10/2017 Chao ....................... H04L 47/21

* cited by examiner

Primary Examiner — Will W Lin
(74) Attorney, Agent, or Firm — Barnes & Thornburg LLP

(57) ABSTRACT

Technologies for adaptive routing using throughput estimation that includes a network switch. The network switch is configured to determine an adjusted average saturation count for each output buffer queue as a function of a present value of a saturation counter of a corresponding output buffer queue and a weighted average saturation count and a running average saturation count for each of the plurality of output buffer queues as a function of the corresponding captured present value and the adjusted average saturation count. The network switch is further configured to determine a congestion rate value for each output buffer queue and a total congestion value as a function of the congestion rate values and a standard occupancy congestion corresponding to a respective one of the plurality of output buffer queues. Other embodiments are described herein.

25 Claims, 6 Drawing Sheets

TECHNOLOGIES FOR ADAPTIVE ROUTING USING THROUGHPUT ESTIMATION

GOVERNMENT RIGHTS CLAUSE

This invention was made with Government support under contract number H98230A-13-D-0124-0168 awarded by the Department of Defense. The Government has certain rights in this invention.

BACKGROUND

Modern computing devices have become ubiquitous tools for personal, business, and social uses. As such, many modern computing devices are capable of connecting to various data networks, including the Internet and corporate intranets, to transmit and receive data communications over the various data networks at varying rates of speed. To facilitate communications between computing devices (e.g., endpoint computing nodes), the data networks typically include one or more network computing nodes (e.g., compute servers, storage servers, etc.) to route communications (e.g., via network switches, network routers, etc.) that enter/exit a network (e.g., north-south network traffic) and between network computing nodes in the network (e.g., east-west network traffic).

Certain network infrastructures, such as data centers, may include tens of thousands or more of such network computing nodes and traffic forwarding devices. To handle such large network infrastructures, adaptive routing technologies have evolved using topology information of the network infrastructure. Traditional methods to determine the topology of the network infrastructure may include one or more of the computing nodes identifying neighboring computing nodes (e.g., those computing nodes that are one hop from the identifying computing node) using static topology information, which cannot typically be applied to the adaptive routing technologies.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
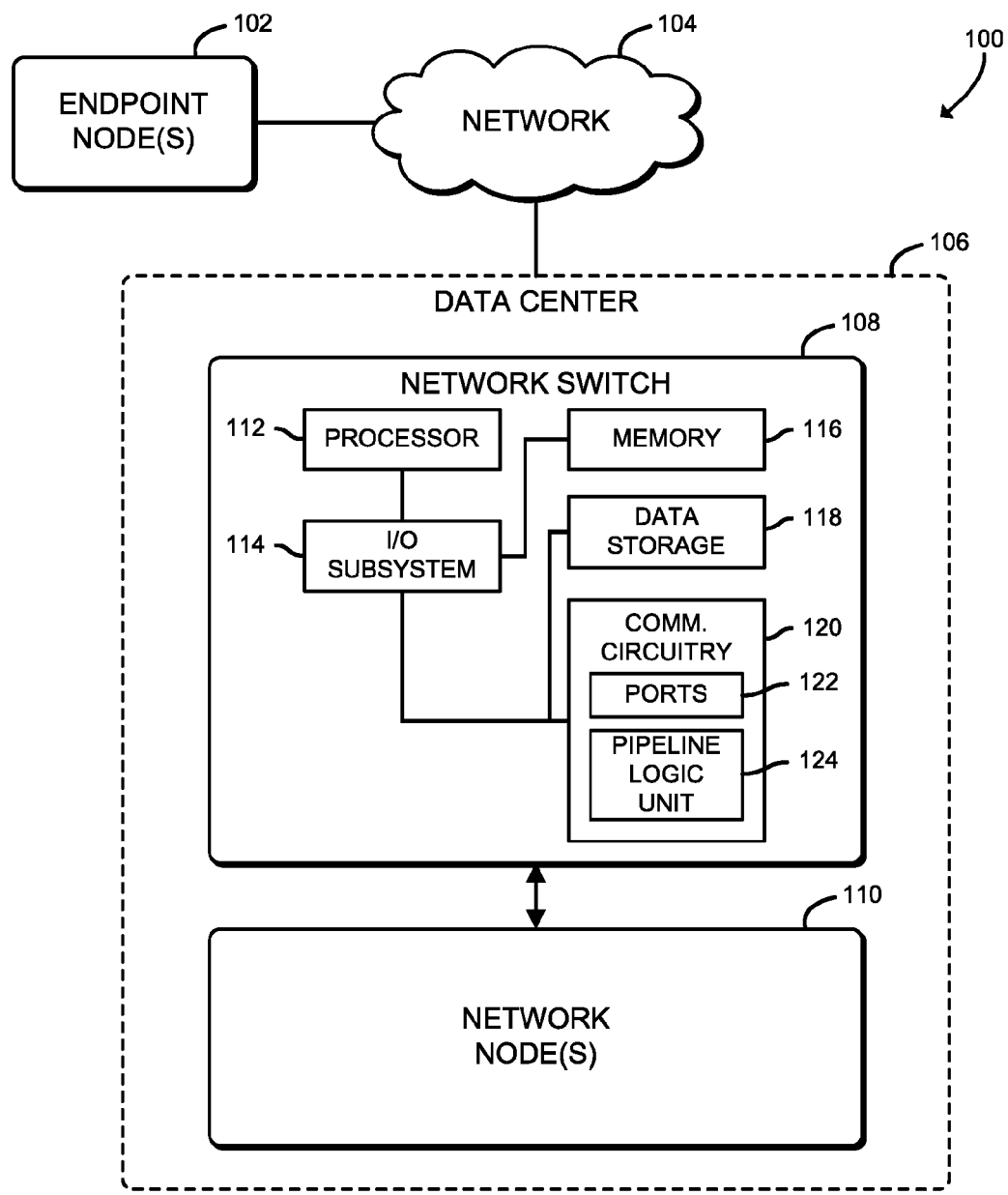
FIG. 1 is a simplified block diagram of at least one embodiment of a system for adaptive routing using throughput estimation that includes a network switch.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media (e.g., memory, data storage, etc.), which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for adaptive routing based on aggregated congestion information includes one or more endpoint nodes 102 communicatively coupled to an illustrative data center 106 via a network 104. The illustrative data center 106 includes a network switch 108 communicatively coupled to one or more network nodes 110 (e.g., one or more compute nodes, one or more storage nodes, a pool of compute/storage resources, etc.) in a switching fabric network topology. In use, the network switch 108 manages the ingress and egress of network traffic to and from the network nodes 110 to which the network switch 108 is connected. Generally, upon receiving a network packet at an input port of the network switch 108, the network switch 108 internally routes the received network packet to an output port of the network switch 108 based on which output port is in an applicable path (e.g., a minimal path or a non-minimal path) usable to forward the network packet to a destination computing device. The applicable path may be determined based at least in part on information of the received network packet, such as a workload type, a destination address (e.g., an internet protocol (IP) address, a destination media access control (MAC) address, etc.), 5-tuple flow identification, etc. Further, in some embodiments, the network switch 108 is configured to determine present conditions of the data center 106 network and dynamically route (i.e., adaptively route) received network packets based on the present conditions, such as by using congestion-based adaptive routing technologies.

Unlike present congestion-based adaptive routing based technologies that rely solely on occupancy congestion values, the network switch 108 is configured to estimate a throughput corresponding to each output buffer queue to which a network packet corresponds and base the output port determination on the estimated throughput. For example, when a fabric network reaches saturation (e.g., network nodes 110 inject more traffic than the fabric network can manage), output buffer queues (see, e.g., the output buffer queues 600 of FIG. 6) of the network switch 108 can fill up, or saturate. Under such conditions, the occupancy based congestion saturates as well, resulting in multiple saturation output buffer queues (see, e.g., the saturated output buffer queues 602, 604, 606 of FIG. 6). As such, any routing decision based on occupancy congestion alone would treat all the saturated output buffer queues as equally likely to be chosen. However, multiple flows can compete for an output buffer queue, affecting the flow rate. Accordingly, the network switch 108 is configured to account for the affected flow rate by estimating the throughput.

To do so, as will be described in detail below, the network switch 108 estimates the rate, or throughput, inside the network switch 108 (see, e.g., the output buffers of the output ports 214 of the illustrative network switch 108 of FIG. 2) to choose the appropriate output port for each network packet. To estimate the rate, the network switch 108 is configured to count how many times an output buffer queue is full during a given monitoring window (e.g., duration of time, number of cycles, etc.), and determine a total congestion value based on the saturated count (i.e., full output buffer queue count) and the occupancy congestion presently used in adaptive routing technologies.

The endpoint nodes 102 may be embodied as any type of computation or computer device capable of performing the functions described herein, including, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, a server (e.g., stand-alone, rack-mounted, blade, etc.), a network appliance (e.g., physical or virtual), a web appliance, a distributed computing system, a processor-based system, and/or a multiprocessor system.

The network 104 may be embodied as any type of wired and/or wireless communication network, including a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other network computing devices (e.g., virtual and/or physical routers, switches, network hubs, servers, storage devices, compute devices, etc.), as needed to facilitate communications between the endpoint nodes 102 and the data center 106, as well as networking devices between data centers 106, which are not shown to preserve clarity of the description.

Similarly, the data center 106 may include various network computing devices (e.g., virtual and/or physical routers, switches, network hubs, servers, storage devices, compute devices, etc.) as well as associated interconnects (e.g., interconnection switches, access switches, port extenders, etc.), switch management software, and/or data cables usable to provide a system of interconnects between the network computing devices (e.g., the network switch 108 and the network nodes 110), such as may be found in the data center 106 (e.g., in an HPC fabric), to provide low-latency and high-bandwidth communication between any two points in the data center 106.

The network switch 108 may be embodied as any type of switch, such as a disaggregated switch, a rack-mounted switch, a standalone switch, a fully managed switch, a partially managed switch, a full-duplex switch, and/or a half-duplex communication mode enabled switch. The network switch 108 may be positioned as a top-of-rack (ToR) switch, an end-or-rack (EoR) switch, a middle-of-rack (MoR) switch, or any position in which the network switch 108 may perform the functions described herein. For example, in some embodiments, the network switch 108 may be configured as a managed smart switch that includes a set of management features, such as may be required for the network switch 108 to perform the functions as described herein.

While the network switch 108 is illustratively embodied as a switch, in other embodiments the network switch may be embodied any type of network computing device (e.g., network traffic managing, processing, and/or forwarding device) capable of performing the functions described herein, such as, without limitation, a disaggregated router, an enhanced network interface controller (NIC) (e.g., a host fabric interface (HFI)), a server (e.g., stand-alone, rack-mounted, blade, etc.), a network appliance (e.g., physical or virtual), a web appliance, a distributed computing system, a processor-based system, and/or a multiprocessor system. It should be appreciated that while the illustrative system 100 includes only includes a single network switch 108, there may be any number of additional network switches 108, as well any number of additional network nodes 110, in other embodiments.

As shown in FIG. 1, the illustrative network switch 108 includes a processor 112, an input/output (I/O) subsystem 114, a memory 116, a data storage device 118, and communication circuitry 120. Of course, the network switch 108 may include fewer or other or additional components, such as those commonly found in a network computing device, in other embodiments. Additionally, in some embodiments, one or more of the illustrative components may be incorporated in, or otherwise form a portion of, another component. For example, the memory 116, or portions thereof, may be incorporated in the processor 112 in some embodiments. Further, in some embodiments, one or more of the illustrative components may be omitted from the network switch 108.

The processor 112 may be embodied as any type of processor capable of performing the functions described herein. For example, the processor 112 may be embodied as one or more single core processors, on or more multi-core processors, a digital signal processor, a microcontroller, or other processor or processing/controlling circuit. Similarly, the memory 116 may be embodied as any type of volatile or non-volatile memory or data storage capable of performing the functions described herein. In operation, the memory 116 may store various data and software used during operation of the network switch 108, such as operating systems, applications, programs, libraries, and drivers.

The memory 116 is communicatively coupled to the processor 112 via the I/O subsystem 114, which may be embodied as circuitry and/or components to facilitate input/output operations with the processor 112, the memory 116, and other components of the network switch 108. For example, the I/O subsystem 114 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 114 may form a portion of a system-on-a-chip (SoC) and be incorporated, along with the processor 112, the memory 116, and other components of the network switch 108, on a single integrated circuit chip.

The data storage device 118 may be embodied as any type of device or devices configured for short-term or long-term storage of data such as, for example, memory devices and circuits, memory cards, hard disk drives, solid-state drives, or other data storage devices. It should be appreciated that the data storage device 118 and/or the memory 116 (e.g., the computer-readable storage media) may store various data as described herein, including operating systems, applications, programs, libraries, drivers, instructions, etc., capable of being executed by a processor (e.g., the processor 112) of the network switch 108.

The communication circuitry 120 may be embodied as any communication circuit, device, or collection thereof, capable of enabling communications between the network switch 108 and other computing devices, such as the network nodes 110, as well as a remote network computing device (e.g., a network controller, a load balancing network switch/router, an aggregated network switch, another network switch 108, etc.) over a network (e.g., the network 104). The communication circuitry 120 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

The illustrative communication circuitry 120 includes multiple switch ports 122 and a pipeline logic unit 124. The multiple switch ports 122 (i.e., input/output ports) may be embodied as any type of network port for transmitting and receiving data to/from the network switch 108. Accordingly, in some embodiments, the network switch 108 may be configured to create a separate collision domain for each of the switch ports 122. As such, depending on the network design of the network switch 108 and the operation mode (e.g., half-duplex, full-duplex, etc.), it should be appreciated that each of the network nodes 110 connected to one of the switch ports 122 of the network switch 108 may be configured to transfer data to any of the other network nodes 110 at any given time, and the transmissions should not interfere, or collide.

The pipeline logic unit 124 may be embodied as any specialized device, circuitry, hardware, or combination thereof to perform pipeline logic (e.g., hardware algorithms) for performing the functions described herein. In some embodiments, the pipeline logic unit 124 may be embodied as a system-on-a-chip (SoC) or otherwise form a portion of a SoC of the network switch 108 (e.g., incorporated, along with the processor 112, the memory 116, the communication circuitry 120, and/or other components of the network switch 108, on a single integrated circuit chip). Alternatively, in some embodiments, the pipeline logic unit 124 may be embodied as one or more discrete processing units of the network switch 108, each of which may be capable of performing one or more of the functions described herein. For example, the pipeline logic unit 124 may be configured to process network packets (e.g., parse received network packets, determine destination computing devices for each received network packets, forward the network packets to a particular buffer queue of a respective buffer of the network switch 108, etc.), perform computational functions, etc.

Each of the network nodes 110 may be embodied as any type of compute and/or storage device capable of performing the functions described herein. For example, each of the network nodes 110 may be embodied as, without limitation, one or more server computing devices, computer mainboards, daughtercards, expansion cards, system-on-a-chips, computer processors, consumer electronic devices, smart appliances, storage disks, and/or any other compute and/or storage device or collection of compute and/or storage devices capable of processing network communications. Accordingly, it should be appreciated that the various network nodes 110 may additionally include components similar to the illustrative network switch 108 as described above, such as, a processor, an I/O subsystem, memory, data storage, and/or communication circuitry. As such, to preserve clarity of the description, descriptions of such like and/or similar components are not described herein. Of course, it should be appreciated that one or more of the network nodes 110 may include additional and/or alternative components, such as those commonly found in a computing device (e.g., various input/output devices), in other embodiments. Additionally, in some embodiments, one or more of the illustrative components may be incorporated in, or otherwise from a portion of, another component.

Figure 2:
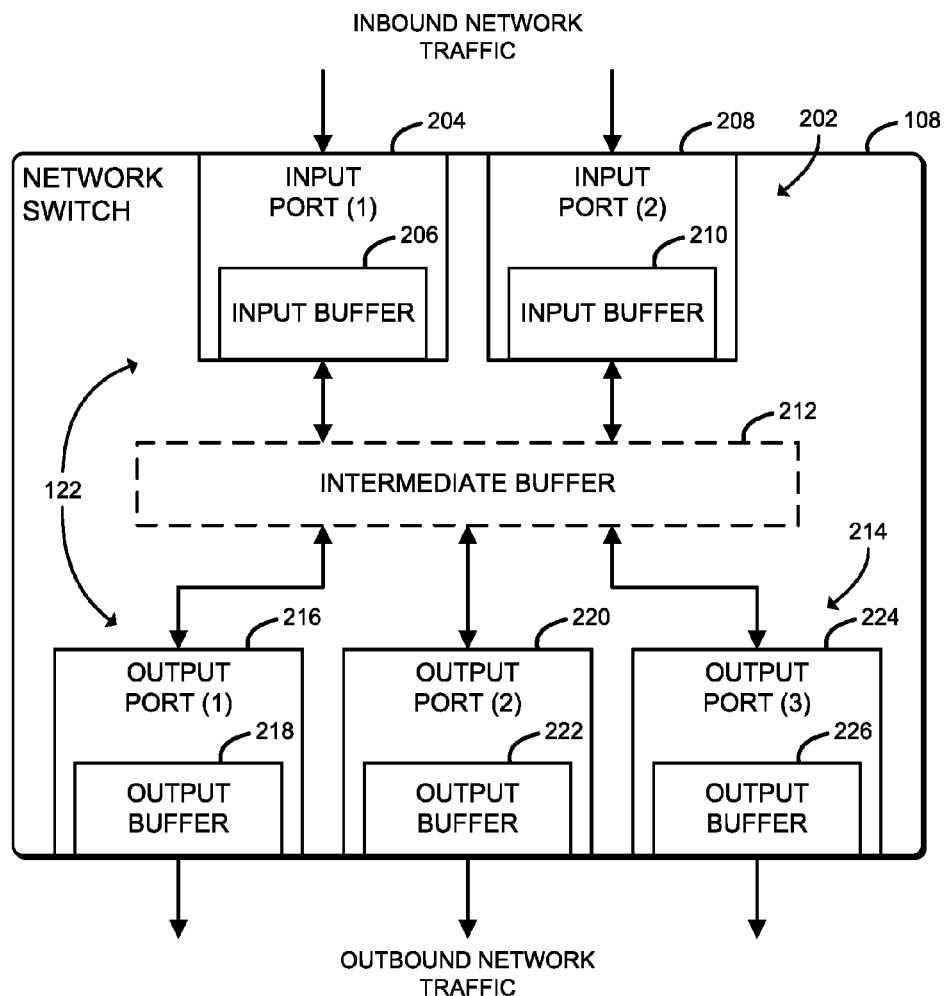
FIG. 2 is a simplified block diagram of at least one embodiment of network traffic flow through the network switch of the system of FIG. 1.

Referring now to FIG. 2, in an illustrative embodiment, the network switch 108 includes multiple input ports 202 communicatively coupled to multiple output ports 214 to facilitate the flow of network traffic through the network switch 108. Each of the input ports 202 is configured to receive inbound network traffic (e.g., network packets, messages, etc.) and transmit the received network traffic to a corresponding one of the output ports 214. The network traffic received by the input ports 202 is forwarded to the appropriate output ports 202 based on a routing decision (e.g., the adaptive routing technologies described herein), which may be made by a logical component (not shown) of the network switch 108, such as a network scheduler, or packet scheduler, and/or a queue manager. The illustrative input ports 202 (i.e., a first input port designated as input port (1) 204 and a second input port designated as input port (2) 208) each include an input buffer (i.e., input buffer 206 of input port (1) 204 and input buffer 210 of input port (2) 208) to store the received network packets (e.g., in input buffer queues of the input buffers 206, 210) before transmission to an appropriate one of the output ports 214.

In some embodiments, one or more intermediate buffers 212 (e.g., in intermediate buffer queues of the one or more intermediate buffers 212) may be used to buffer network traffic from the input ports 202 and utilize the adaptive routing technologies described herein to determine the appropriate one of the output ports 214 to transmit each received network packet. Each of the illustrative output ports 214 (i.e., a first output port designated as output port (1) 216, a second output port designated as output port (2) 220, and a third output port designated as output port (3) 224) similarly include an output buffer (i.e., output buffer 218 of output port (1) 204, output buffer 222 of output port (2) 220, and output buffer 226 of output port (3) 224) for queuing received network packets from the input ports 202 or the intermediate buffer 212, depending on the embodiment.

The output ports 214 are configured to forward outbound network traffic (i.e., from the applicable output buffer queues) to a target computing device (e.g., a corresponding one of the network nodes 110, another network switch 108, etc.) to which the network packet is to be forwarded. It should be appreciated that each output buffer of the output ports 214 can include more than one output buffer queue (see, e.g., the output buffer queues 600 of the output ports 214 of FIG. 6) and each of the output buffer queues can be assigned to a different input row (e.g., in a tile-based architecture) or to one or more virtual channels, depending on the embodiment. It should be appreciated that each of the output buffer queues logically belongs to a respective one of the output ports 214, but may physically be present in another location (e.g., another component) within the switch 108. For example, in some embodiments, there may be a per-output-port queue in the intermediate buffer 212 or one of the input buffers 206 that is logically mapped to a respective one of the output ports 214.

Figure 3:
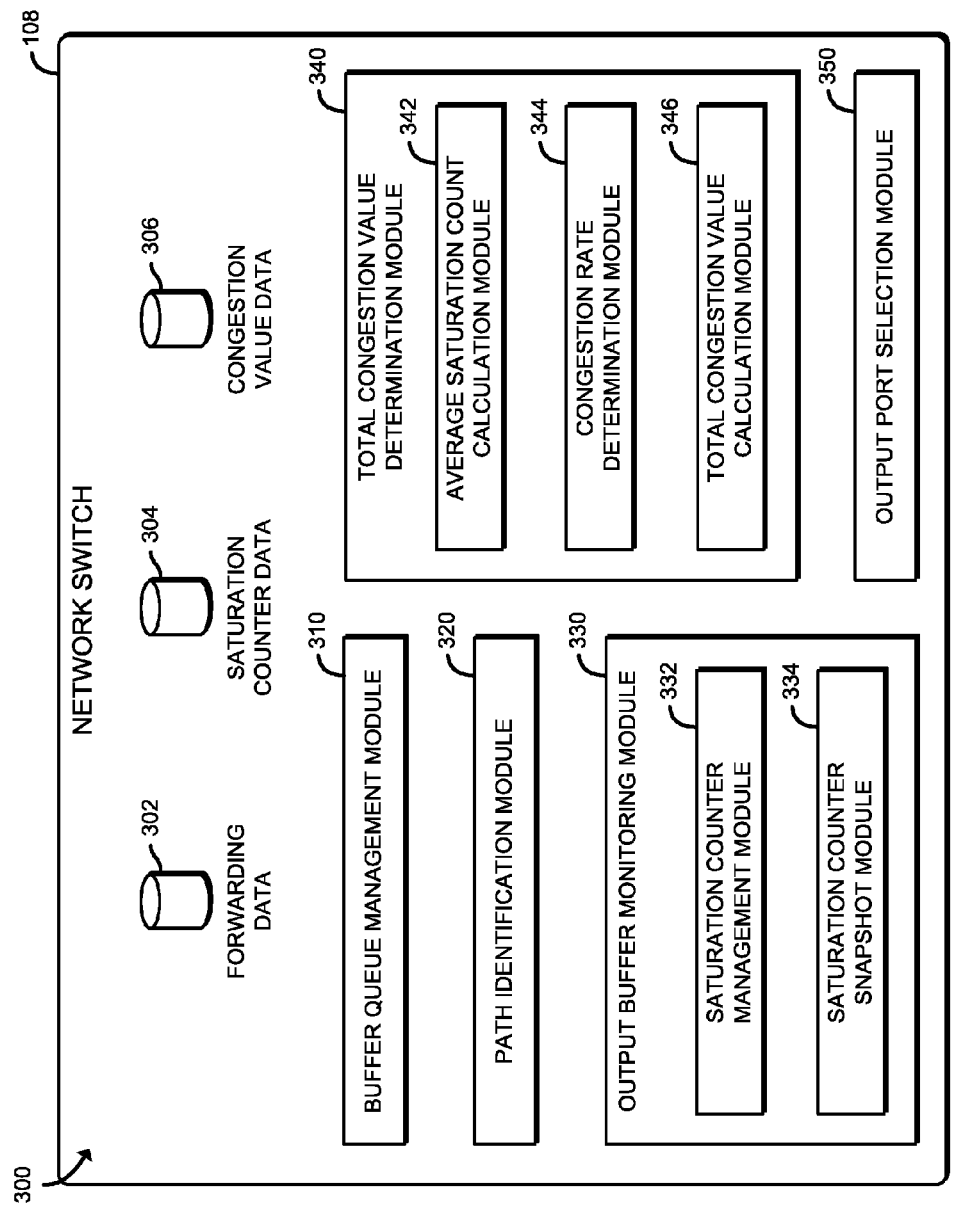
FIG. 3 is a simplified block diagram of at least one embodiment of an environment that may be established by the network switch of the system of FIG. 1.

Referring now to FIG. 3, in an illustrative embodiment, the network switch 108 establishes an environment 300 during operation. The illustrative environment 300 includes a buffer queue management module 310, a path identification module 320, an output buffer monitoring module 330, a total congestion value determination module 340, and an output port selection module 350. The various modules of the environment 300 may be embodied as hardware, firmware, software, or a combination thereof. As such, in some embodiments, one or more of the modules of the environment 300 may be embodied as circuitry or collection of electrical devices (e.g., a buffer queue management circuit 310, a path identification circuit 320, an output buffer monitoring circuit 330, a total congestion value determination circuit 340, an output port selection circuit 350, etc.).

It should be appreciated that, in such embodiments, one or more of the buffer queue management circuit 310, the path identification circuit 320, the output buffer monitoring circuit 330, the total congestion value determination circuit 340, and/or the output port selection circuit 350 may form a portion of the one or more of the processor(s) 112, the I/O subsystem 114, the communication circuitry 120, the pipeline logic unit 124, and/or other components of the network switch 108. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the one or more processors and/or other components of the network switch 108. It should be further appreciated that, in some embodiments, one or more of the buffer queue management circuit 310, the path identification circuit 320, the output buffer monitoring circuit 330, the total congestion value determination circuit 340, and/or the output port selection circuit 350 may be implemented as special purpose hardware components, such as those circuits that may be on a critical path.

In the illustrative environment 300, the network switch 108 further includes forwarding data 302, saturation counter data 304, and congestion value data 306, each of which may be stored in a memory and/or data storage device of the network switch 108. Further, each of the forwarding data 302, the saturation counter data 304, and the congestion value data 306 may be accessed by the various modules and/or sub-modules of the network switch 108. Additionally, it should be appreciated that in some embodiments the data stored in, or otherwise represented by, each of the forwarding data 302, the saturation counter data 304, and the congestion value data 306 may not be mutually exclusive relative to each other.

For example, in some implementations, data stored in the forwarding data 302 may also be stored as a portion of the saturation counter data 304 and/or the congestion value data 306, and/or vice versa. As such, although the various data utilized by the network switch 108 is described herein as particular discrete data, such data may be combined, aggregated, and/or otherwise form portions of a single or multiple data sets, including duplicative copies, in other embodiments. It should be further appreciated that the network switch 108 may include additional and/or alternative components, sub-components, modules, sub-modules, and/or devices commonly found in a network computing device, which are not illustrated in FIG. 3 for clarity of the description.

The buffer queue management module 310, which may be embodied as hardware, firmware, software, virtualized hardware, emulated architecture, and/or a combination thereof as discussed above, is configured to manage the buffer buffers (e.g., each buffer including a number of buffer queues) of the network switch 108. For example, the buffer queue management module 310 may be configured to manage the input buffer (e.g., of the input ports 202), the intermediate buffers (e.g., the intermediate buffers 212 of FIG. 2), and output buffer (e.g., of the output ports 214) of the network switch 108. To do so, the buffer queue management module 310 is configured to enqueue and dequeue network traffic received by the network switch 108 into and out of the respective buffers (i.e., the respective buffer queues).

The path identification module 320, which may be embodied as hardware, firmware, software, virtualized hardware, emulated architecture, and/or a combination thereof as discussed above, is configured to identify applicable paths (e.g., minimal paths and non-minimal paths) for each received network packet. To do so, the path identification module 320 may identify a characteristic of the network packet to determine a destination computing device. The characteristic may include any data usable to identify the corresponding destination computing device, such as a workload type, a destination address (e.g., an IP address, a destination MAC address, etc.), 5-tuple flow identification, etc. Accordingly, in some embodiments, the characteristic may be used to perform a lookup (e.g., in a flow lookup table, a routing table, etc.) to determine the destination computing device. In some embodiments, the lookup data may be stored in the forwarding data 302.

The path identification module 320 is further configured to identify one or more minimal paths and one or more non-minimal paths based on the determined destination computing device. It should be appreciated that, in adaptive routing, the network switch 108 can route a network packet either through a minimal path or a non-minimal path. It should be further appreciated that a minimal path is a path to the determined destination computing device that takes the least amount of hops, while the non-minimal path is any path to the determined destination computing device that takes more hops (e.g., twice as many hops) as the minimal path(s). Accordingly, it should be appreciated that the computing device to which the network packet is forwarded from the network switch 108 may not be to the determined destination computing device, but rather to a target computing device in the path between the network switch 108 and the determined destination computing device. In some embodiments, path data (e.g., hop data, in-path computing device information, etc.) may be stored in the forwarding data 302.

Figure 6:
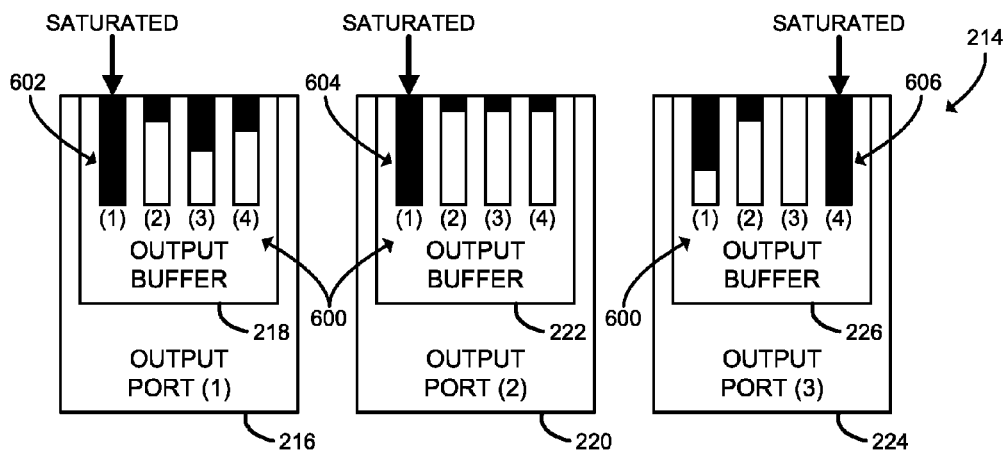
FIG. 6 is a simplified illustration of at least one embodiment for visualizing output buffer queue saturation of output port buffer queues of the network switch of FIG. 3.

The output buffer monitoring module 330, which may be embodied as hardware, firmware, software, virtualized hardware, emulated architecture, and/or a combination thereof as discussed above, is configured to monitor saturation levels for each output buffer based on the occupancy count of each of the output buffer queues (see, e.g., the output buffer queues 600 of FIG. 6). To do so, the illustrative output buffer monitoring module 330 includes a saturation counter management module 332 and a saturation counter snapshot module 334. It should be appreciated that each of the saturation counter management module 332 and the saturation counter snapshot module 334 of the output buffer monitoring module 330 may be separately embodied as hardware, firmware, software, virtualized hardware, emulated architecture, and/or a combination thereof. For example, the saturation counter management module 332 may be embodied as a hardware component, while the saturation counter snapshot module 334 may be embodied as a virtualized hardware component or as some other combination of hardware, firmware, software, virtualized hardware, emulated architecture, and/or a combination thereof.

The saturation counter management module 332 is configured to manage the saturation counters corresponding to each of the output buffer queues. To do so, the saturation counter management module 332 is configured to increment a saturation counter corresponding to a particular one of the output buffer queues upon detection that the output buffer queue is saturated. In some embodiments, the output buffer queues may be polled in some embodiments to determine a present congestion level (e.g., saturated or not saturated) of each of the output buffer queues. Accordingly, the saturation counter management module 332 may be configured to detect an occupancy count for each output buffer queue of each output buffer for each output port 214 to determine the congestion level (i.e., to determine whether the congestion level is equal to a maximum congestion level). To do so, the saturation counter management module 332 may be configured to detect a number of elements presently enqueued in each output buffer queue of an output buffer and compare the detected number of elements against the maximum congestion level, or the number of elements indicative of the output buffer queue being saturated (i.e., full). Additionally or alternatively, in other embodiments, the output buffer queue(s) may trigger events upon saturation of the respective output buffer queue(s), which are usable by the saturation counter management module 332 to increment the corresponding saturation counter(s). In some embodiments, the values of the saturation counters may be stored in the saturation counter data 304.

Referring now to FIG. 6, an illustrative embodiment for visualizing output buffer queue saturation of the output buffer queues 600 is shown. In the illustrative embodiment, each of output buffer queue (1) 602 of the output port (1) 216, output buffer queue (1) 604 of the output port (2) 220, and output buffer queue (4) 606 of the output port (3) 224 are presently saturated. In other words, the present congestion level is equal to a maximum congestion level, as shown in each of the saturated output buffer queues 602, 604, 606. Accordingly, under such conditions, the saturation counter management module 332 is configured to increment a corresponding saturation counter for each of the saturated output buffer queues 602, 604, 606.

The saturation counter snapshot module 334 is configured to capture a value of each of the saturation counters at a particular point in time. Additionally, the saturation counter snapshot module 334 is configured to capture the values upon reaching the end of a monitoring window. The monitoring window may be embodied as any type of threshold usable to trigger the snapshot capture, such as a duration of time, a maximum number of cycles, a maximum number of network packets dequeued from the input buffer queues (e.g., of the input buffers 206, 210), a maximum number of network packets dequeued from the intermediate buffer 212, etc. In some embodiments, data related to the monitoring window may be stored in the saturation counter data 304. It should be appreciated that the saturation counter snapshot module 334 may be further configured to reset the saturation counters to zero subsequent to capturing each of their respective values.

The total congestion value determination module 340, which may be embodied as hardware, firmware, software, virtualized hardware, emulated architecture, and/or a combination thereof as discussed above, is configured to determine a total congestion value for each output buffer queue. To do so, the illustrative total congestion value determination module 340 includes an average saturation count calculation module 342, a congestion rate determination module 344, and a total congestion value calculation module 346. It should be appreciated that each of the average saturation count calculation module 342, the congestion rate determination module 344, and the total congestion value calculation module 346 of the total congestion value determination module 340 may be separately embodied as hardware, firmware, software, virtualized hardware, emulated architecture, and/or a combination thereof. For example, the average saturation count calculation module 342 may be embodied as a hardware component, while the congestion rate determination module 344 and/or the total congestion value calculation module 346 may be embodied as a virtualized hardware component or as some other combination of hardware, firmware, software, virtualized hardware, emulated architecture, and/or a combination thereof.

The average saturation count calculation module 342 is configured to determine a running average saturation count per output buffer queue upon reaching the end of a monitoring window (e.g., a predetermined duration of time has elapsed, a predetermined number of cycles has been reached, etc.). To do so, the average saturation count calculation module 342 is configured to determine a weighted average saturation count by applying a weighted moving average (e.g., an exponentially weighted moving average) to a most recently calculated average saturation count for a particular one of the output buffer queues. The average saturation count calculation module 342 is further configured to determine an adjusted average saturation count by subtracting the weighted average saturation count from the most recently calculated average saturation count. For example, the average saturation count calculation module 342 may be configured to determine the weighted average saturation count by performing a bit shift operation on the most recently calculated average saturation count (i.e., based on the weighted moving average to be applied) and subtracting the result of the bit shift operation from the most recently calculated average saturation count. To determine the running average saturation count, the average saturation count calculation module 342 is additionally configured to add the adjusted average saturation count to a value of a corresponding saturation counter.

The congestion rate determination module 344 is configured to determine a congestion rate value for each output buffer queue based on the result of the applied weighted moving average operation performed on the most recently calculated average saturation count. To do so, the congestion rate determination module 344 is configured to perform a lookup operation on a translation table using the running average saturation count (e.g., as may be determined by the average saturation count calculation module 342) to retrieve a corresponding congestion rate value. For example, the congestion rate determination module 344 may be configured to retrieve an arbitrary congestion rate mapped to the value of the weighted average saturation count. Accordingly, a linear mapping, a logarithmic mapping, any other mapping, or any combination of different mappings may be used to map the value of the weighted average saturation count to the corresponding congestion rate value.

The total congestion value calculation module 346 is configured to determine a total congestion value based on a weighted congestion rate value and a weighted standard occupancy congestion value. To determine the weighted congestion rate value, the total congestion value calculation module 346 is configured to apply a configurable congestion rate weight to the congestion rate value. Similarly, to determine the weighted standard occupancy congestion value, the total congestion value calculation module 346 is configured to apply a configurable occupancy weight to a standard occupancy congestion value (i.e., the result of present congestion-based adaptive routing based technologies).

The output port selection module 350, which may be embodied as hardware, firmware, software, virtualized hardware, emulated architecture, and/or a combination thereof as discussed above, is configured to select which output port to transfer the network packet to. To do so, the output port selection module 350 is configured to select which output port is to forward the network packet based on the lowest total congestion value across the output buffer queues in the path of a received network packet, such as may be determined by the total congestion value determination module 340. In other words, the output port selection module 350 is configured to determine which output port to queue the network packet in (i.e., to be forwarded to a target computing device) based on which output buffer queue has the lowest total congestion value, thereby promoting fairness in selection across the output ports 214.

Figure 4A:
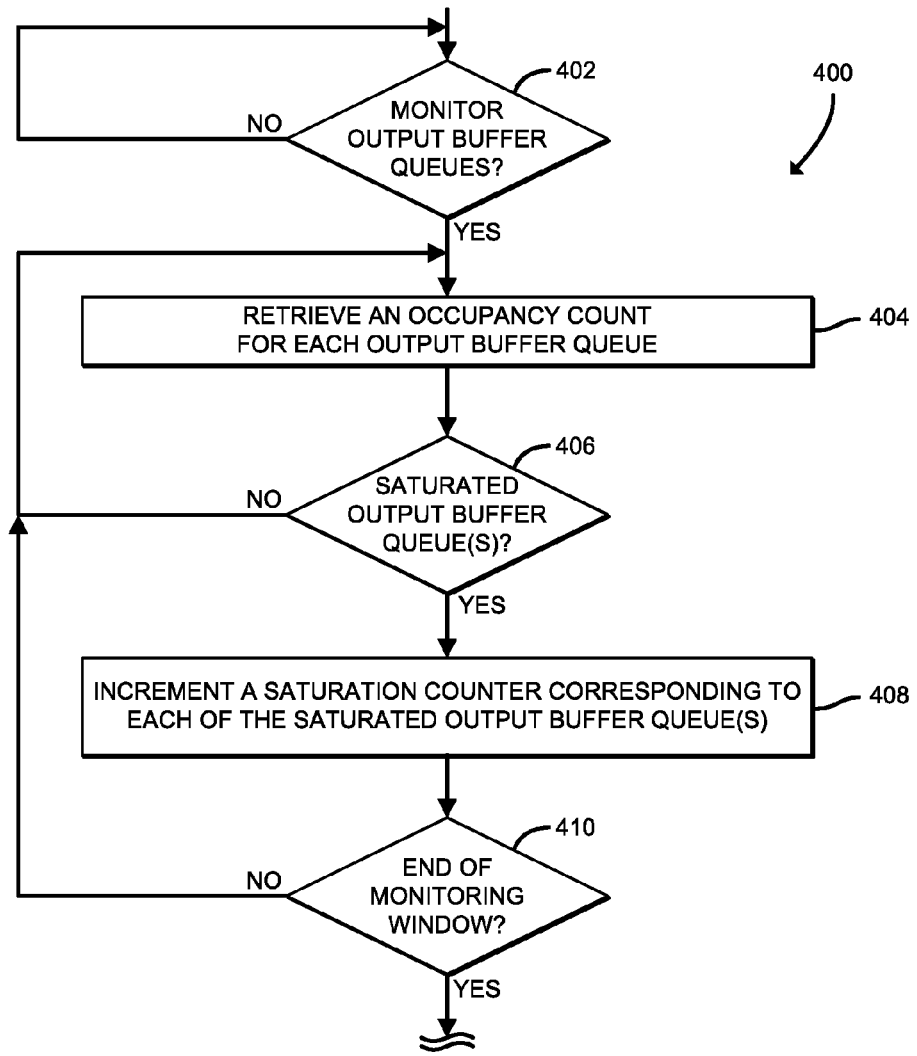
FIGS. 4A and 4B is a simplified flow diagram of at least one embodiment of a method for adaptive routing based on an estimated throughput that may be executed by the network switch of FIG. 3.
Figure 4B:
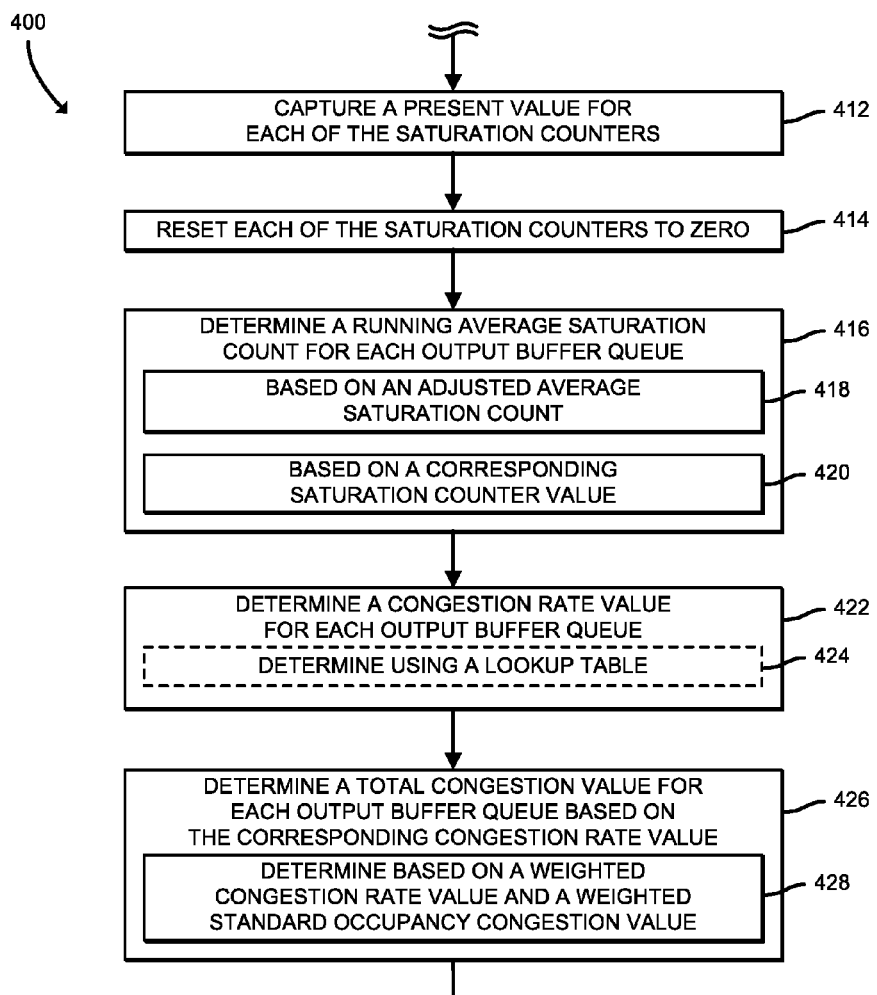

Referring now to FIGS. 4A and 4B, in use, the network switch 108 (e.g., the pipeline logic unit 124) may execute a method 400 for adaptive routing based on an estimated throughput. The method 400 begins in block 402, in which the network switch 108 determines whether to monitor output buffer queues of the output ports 214. If so, the method 400 advances to block 404, in which the network switch 108 retrieves an occupancy count for each output buffer queue. In block 406, the network switch 108 determines whether one or more output buffer queues are saturated. If not, the method 400 returns to block 404 in which the network switch 108 again retrieves an occupancy count for each output buffer queue; otherwise, the method 400 advances to block 408. In block 408, the network switch 108 increments a saturation counter corresponding to each of the saturated output buffer queues. While the method 400 describes the network switch as using a polling technique, it should be appreciated that, in other embodiments, the network switch may be configured to determine output buffer queue saturation using alternative techniques, such as events triggered by the output buffer queues upon saturation that are usable (e.g., by the input buffers and/or the intermediate buffers) to increment the corresponding saturation counter(s) upon receipt.

In block 410, the network switch 108 determines whether the end of a monitoring window has been reached. As described previously, the monitoring window may be embodied as any type of threshold usable to trigger the snapshot capture, such as a duration of time, a maximum number of cycles, a maximum number of network packets dequeued (e.g., from the input buffer queues of the input buffers 206, 210, or the intermediate buffer 212, depending on the embodiment), etc. If the end of a monitoring window has not been reached, the method 400 returns to block 404 in which the network switch 108 again retrieves an occupancy count for each output buffer queue; otherwise, the method 400 advances to block 412, as shown in FIG. 4B.

In block 412, the network switch 108 captures a present value of each saturation counter corresponding to a respective output buffer queue. In block 414, the network switch 108 resets each of the saturation counters to zero. In block 416, the network switch 108 determines a running average saturation count for each output buffer queue. To do so, in block 418, the network switch 108 determines the running average saturation count based on an adjusted average saturation count. As described previously, the adjusted average saturation count may be calculated based on a difference between a most recently calculated average saturation count and a weighted average (e.g., an exponentially weighted average) of the most recently calculated average saturation count. Additionally, in block 420, the network switch 108 determines the running average saturation count based on a saturation counter value that corresponds to a respective output buffer queue. As also described previously, the running average saturation count may be calculated based on a sum of the adjusted average saturation count and saturation counter value of a corresponding output buffer queue.

In block 422, the network switch 108 determines a congestion rate value for each output buffer queue. To do so, in some embodiments, in block 424, the network switch 108 determines the congestion rate value based on a lookup performed using a translation table that returns a congestion rate value that has been mapped to the running average saturation count. In block 426, the network switch 108 determines a total congestion value for each output buffer queue based on the congestion rate value determined for each output buffer queue in block 422. To do so, in block 428, the network switch 108 determines the total congestion value based on a sum of a weighted congestion rate value (e.g., a product of a congestion rate weight and the congestion rate value determined in block 422) and a weighted standard occupancy congestion value (e.g., a product of an occupancy weight and a standard occupancy congestion value determined using present congestion-based adaptive routing based technologies).

Figure 5:
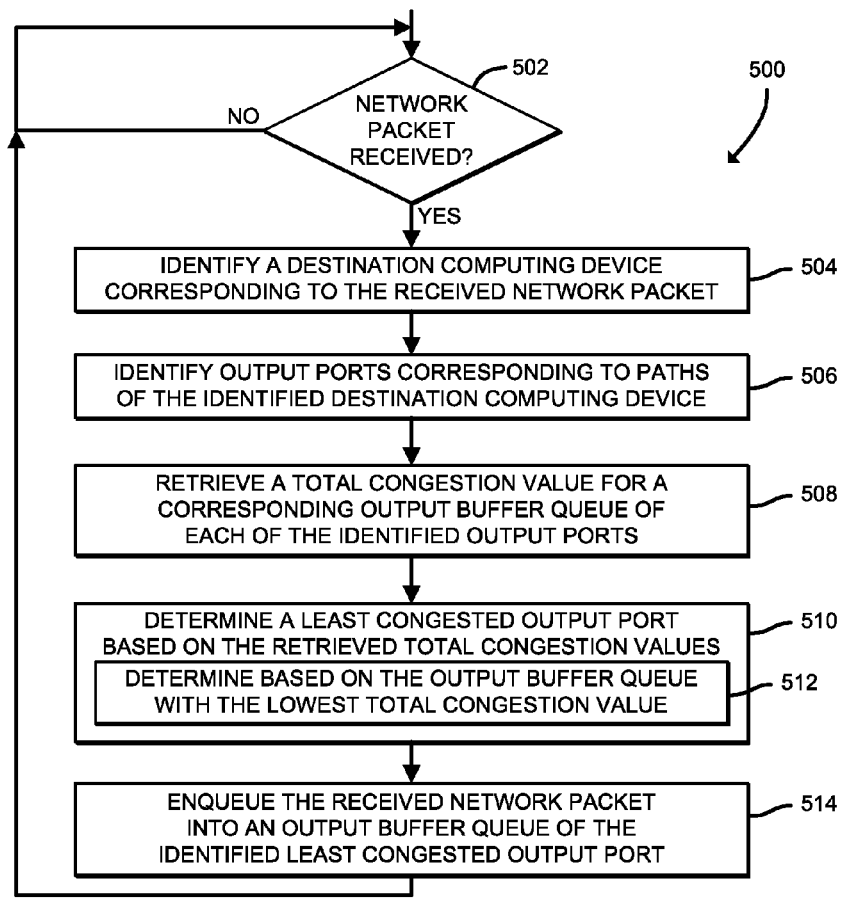
FIG. 5 is a simplified flow diagram of at least one embodiment of a method for determining which output port of the network switch of FIG. 3 to enqueue received network packets.

Referring now to FIG. 5, in use, the network switch 108 (e.g., the pipeline logic unit 124) may execute a method 500 for determining which output port of the network switch of FIG. 3 to enqueue received network packets. The method 500 begins in block 502, in which the network switch 108 determines whether a network packet has been received. If so, the method 500 advances to block 504, in which the network switch 108 identifies a destination computing device (e.g., a network node local to or remote of the network switch 108) corresponding to the received network packet. In block 506, the network switch 108 identifies multiple output ports to forward the received network packet to, each of which are identified based on which of the output ports correspond to paths (e.g., minimal or non-minimal paths) to the destination computing device. As described previously, it should be appreciated that the identified output ports may output the network packet to a target computing device (e.g., another network switch 108, a network node local to or remote of the network switch 108, etc.) different from the destination computing device that is in an identified path to the destination computing device.

In block 508, the network switch 108 retrieves a total congestion value for a corresponding output buffer queue of each of the identified output ports. In block 510, the network switch 108 determines a least congested output port based on the retrieved total congestion values. To do so, the network switch 108 determines which output buffer queue has the lowest total congestion value 512. In block 514, the network switch 108 enqueues the network packet received in block 502 into the output port identified in block 510 as having the lowest total congestion value.

It should be appreciated that, in some embodiments, the methods 400 and 500 may be embodied as various instructions stored on a computer-readable media, which may be executed by a processor (e.g., the processor 112), the communication circuitry 120, and/or other components of the network switch 108 to cause the network switch 108 to perform at least a portion of the methods 400 and 500. The computer-readable media may be embodied as any type of media capable of being read by the network switch 108 including, but not limited to, the memory 116, the data storage device 118, other memory or data storage devices of the network switch 108, portable media readable by a peripheral device of the network switch 108, and/or other media. Additionally or alternatively, in some embodiments, the pipeline logic unit 124 may be configured to perform at least a portion of the methods 400 and/or 500 or otherwise cause the network switch 108 to perform at least a portion of the methods 400 and/or 500

EXAMPLES

Illustrative examples of the technologies disclosed herein are provided below. An embodiment of the technologies may include any one or more, and any combination of, the examples described below.

Example 1 includes a network switch for adaptive routing using throughput estimation, the network switch comprising a plurality of input ports communicatively coupled to a plurality of output ports; and a pipeline logic unit to determine, for each output port, an occupancy count for each of a plurality of output buffer queues of the corresponding output port, wherein each occupancy count defines a present number of elements in the corresponding output buffer queue; increment a saturation counter of a corresponding one of the plurality of output buffer queues in response to a determination that the corresponding one of the plurality of output buffer queues is saturated based on the corresponding occupancy count; capture a present value of each saturation counter upon a determination that an end of a monitoring window has been reached; determine, for each output buffer queue, an adjusted average saturation count as a function of the present value of the saturation counter of the corresponding output buffer queue and a weighted average saturation count; determine, for each output buffer queue, a running average saturation count for each of the plurality of output buffer queues as a function of the corresponding captured present value and the adjusted average saturation count; determine, for each output buffer queue, a congestion rate value, wherein the congestion rate value comprises an arbitrary value mapped to the running average saturation count; and determine, for each output buffer queue, a total congestion value as a function of a corresponding congestion rate value and a standard occupancy congestion corresponding to a respective one of the plurality of output buffer queues.

Example 2 includes the subject matter of Example 1, and wherein to determine the total congestion value for each of the plurality of output buffer queues further comprises to determine the total congestion value for each of the plurality of output buffer queues as a function of a standard occupancy congestion corresponding to a respective one of the plurality of output buffer queues.

Example 3 includes the subject matter of any of Examples 1 and 2, and wherein to determine the total congestion value for each of the plurality of output buffer queues comprises to (i) determine a weighted congestion rate value as a function of configurable congestion rate weight and the corresponding congestion rate value, (ii) determine a weighted standard occupancy congestion value as a function of a corresponding standard occupancy congestion value and a configurable occupancy weight, and (iii) determine the total congestion value as a sum of the weighted congestion rate value and the weighted standard occupancy congestion value.

Example 4 includes the subject matter of any of Examples 1-3, and wherein the pipeline logic unit is further to identify an output buffer queue for each of the plurality of output ports which correspond to one of a plurality of paths usable to forward a network packet to a destination computing device; retrieve the total congestion value for each of the output buffer queues of the set of the plurality of output buffer queues; and enqueue the network packet into one of the subset of the plurality of output buffer queues based on the retrieved total congestion values.

Example 5 includes the subject matter of any of Examples 1-4, and wherein to enqueue the network packet into the one of the subset of the plurality of output buffer queues based on the retrieved total congestion values comprises to enqueue the network packet into one of the subset of the plurality of output buffer queues based on which of one of the subset of the plurality of output buffer queues has the lowest total congestion value.

Example 6 includes the subject matter of any of Examples 1-5, and wherein to determine a congestion rate value for each of the plurality of output buffer queues comprises to perform a lookup on a translation table, wherein the translation table maps congestion rates to weighted average saturation count values.

Example 7 includes the subject matter of any of Examples 1-6, and wherein the pipeline logic unit is further to perform a bit shift operation on the most recently calculated average saturation count, and wherein the weighted average saturation count is a result of the performed bit shift operation.

Example 8 includes the subject matter of any of Examples 1-7, and wherein to capture the present value for each of the saturation counters comprises to capture the present value for each of the saturation counters upon a determination that an end of a monitoring window has been reached.

Example 9 includes the subject matter of any of Examples 1-8, and wherein to determine whether the end of the monitoring window has been reached comprises to determine one of whether a duration of time has elapsed, a maximum number of cycles of one of the one or more processors has been reached, or a maximum number of network packets have been dequeued from one of the plurality of input ports.

Example 10 includes the subject matter of any of Examples 1-9, and wherein the pipeline logic unit is further to determine the weighted average saturation count as a function of a weighted average of a most recently calculated average saturation count of the corresponding output buffer queue.

Example 11 includes a network switch for adaptive routing using throughput estimation, the network switch comprising one or more processors; a plurality of input ports communicatively coupled to a plurality of output ports; and an output buffer monitoring circuit to determine, for each output port, an occupancy count for each of a plurality of output buffer queues of the corresponding output port, wherein each occupancy count defines a present number of elements in the corresponding output buffer queue, increment a saturation counter of a corresponding one of the plurality of output buffer queues in response to a determination that the corresponding one of the plurality of output buffer queues is saturated based on the corresponding occupancy count, and capture a present value of each saturation counter upon a determination that an end of a monitoring window has been reached; a total congestion value determination circuit to determine, for each output buffer queue, an adjusted average saturation count as a function of the present value of the saturation counter of the corresponding output buffer queue and a weighted average saturation count, determine, for each output buffer queue, a running average saturation count for each of the plurality of output buffer queues as a function of the corresponding captured present value and the adjusted average saturation count, determine, for each output buffer queue, a congestion rate value, wherein the congestion rate value comprises an arbitrary value mapped to the running average saturation count, and determine, for each output buffer queue, a total congestion value as a function of a corresponding congestion rate value and a standard occupancy congestion corresponding to a respective one of the plurality of output buffer queues.

Example 12 includes the subject matter of Example 11, and wherein to determine the total congestion value for each of the plurality of output buffer queues further comprises to determine the total congestion value for each of the plurality of output buffer queues as a function of a standard occupancy congestion corresponding to a respective one of the plurality of output buffer queues.

Example 13 includes the subject matter of any of Examples 11 and 12, and wherein to determine the total congestion value for each of the plurality of output buffer queues comprises to (i) determine a weighted congestion rate value as a function of configurable congestion rate weight and the corresponding congestion rate value, (ii) determine a weighted standard occupancy congestion value as a function of a corresponding standard occupancy congestion value and a configurable occupancy weight, and (iii) determine the total congestion value as a sum of the weighted congestion rate value and the weighted standard occupancy congestion value.

Example 14 includes the subject matter of any of Examples 11-13, and further including a path identification circuit to identify an output buffer queue for each of the plurality of output ports which correspond to one of a plurality of paths usable to forward a network packet to a destination computing device; and an output port selection circuit to (i) retrieve the total congestion value for each of the output buffer queues of the set of the plurality of output buffer queues and (ii) determine a corresponding one of the subset of the plurality of output buffer queues based on the retrieved total congestion values; and a buffer queue management circuit to enqueue the network packet into the determined one of the subset of the plurality of output buffer queues.

Example 15 includes the subject matter of any of Examples 11-14, and wherein to enqueue the network packet into the one of the subset of the plurality of output buffer queues based on the retrieved total congestion values comprises to enqueue the network packet into one of the subset of the plurality of output buffer queues based on which of one of the subset of the plurality of output buffer queues has the lowest total congestion value.

Example 16 includes the subject matter of any of Examples 11-15, and wherein to determine a congestion rate value for each of the plurality of output buffer queues comprises to perform a lookup on a translation table, wherein the translation table maps congestion rates to weighted average saturation count values.

Example 17 includes the subject matter of any of Examples 11-16, and wherein the total congestion value determination circuit is further to perform a bit shift operation on the most recently calculated average saturation count, and wherein the weighted average saturation count is a result of the performed bit shift operation.

Example 18 includes the subject matter of any of Examples 11-17, and wherein to capture the present value for each of the saturation counters comprises to capture the present value for each of the saturation counters upon a determination that an end of a monitoring window has been reached.

Example 19 includes the subject matter of any of Examples 11-18, and wherein to determine whether the end of the monitoring window has been reached comprises to determine one of whether a duration of time has elapsed, a maximum number of cycles of one of the one or more processors has been reached, or a maximum number of network packets have been dequeued from one of the plurality of input ports.

Example 20 includes the subject matter of any of Examples 11-19, and wherein the total congestion value determination circuit is further to determine the weighted average saturation count as a function of a weighted average of a most recently calculated average saturation count of the corresponding output buffer queue.

Example 21 includes a method for adaptive routing using throughput estimation, the method comprising determining, by a network switch, for each output port of a plurality of output ports of the network switch, an occupancy count for each of a plurality of output buffer queues of the corresponding output port, wherein each occupancy count defines a present number of elements in the corresponding output buffer queue; incrementing, by the network switch, for each of a corresponding one of the plurality of output buffer queues, a saturation counter in response to a determination that the corresponding one of the plurality of output buffer queues is saturated based on the corresponding occupancy count; capturing, by the network switch, a present value of each saturation counter upon a determination that an end of a monitoring window has been reached; determining, by the network switch, for each output buffer queue, an adjusted average saturation count as a function of the present value of the saturation counter of the corresponding output buffer queue and a weighted average saturation count; determining, by the network switch, for each output buffer queue, a running average saturation count for each of the plurality of output buffer queues as a function of the corresponding captured present value and the adjusted average saturation count; determining, by the network switch, for each output buffer queue, a congestion rate value, wherein the congestion rate value comprises an arbitrary value mapped to the running average saturation count; and determining, by the network switch, for each output buffer queue, a total congestion value as a function of the congestion rate values and a standard occupancy congestion corresponding to a respective one of the plurality of output buffer queues.

Example 22 includes the subject matter of Example 21, and wherein determining the total congestion value for each of the plurality of output buffer queues further comprises determining the total congestion value for each of the plurality of output buffer queues as a function of a standard occupancy congestion corresponding to a respective one of the plurality of output buffer queues.

Example 23 includes the subject matter of any of Examples 21 and 22, and wherein determining the total congestion value for each of the plurality of output buffer queues comprises (i) determining a weighted congestion rate value as a function of configurable congestion rate weight and the corresponding congestion rate value, (ii) determining a weighted standard occupancy congestion value as a function of a corresponding standard occupancy congestion value and a configurable occupancy weight, and (iii) determining the total congestion value as a sum of the weighted congestion rate value and the weighted standard occupancy congestion value.

Example 24 includes the subject matter of any of Examples 21-23, and further including identifying, by the network switch, an output buffer queue for each of the plurality of output ports which correspond to one of a plurality of paths usable to forward a network packet to a destination computing device; retrieving, by the network switch, the total congestion value for each of the output buffer queues of the set of the plurality of output buffer queues; and enqueuing, by the network switch, the network packet into one of the subset of the plurality of output buffer queues based on the retrieved total congestion values.

Example 25 includes the subject matter of any of Examples 21-24, and wherein enqueuing the network packet into the one of the subset of the plurality of output buffer queues based on the retrieved total congestion values comprises enqueuing the network packet into one of the subset of the plurality of output buffer queues based on which of one of the subset of the plurality of output buffer queues has the lowest total congestion value.

Example 26 includes the subject matter of any of Examples 21-25, and wherein determining a congestion rate value for each of the plurality of output buffer queues comprises performing a lookup on a translation table, wherein the translation table maps congestion rates to weighted average saturation count values.

Example 27 includes the subject matter of any of Examples 21-26, and further including performing a bit shift operation on the most recently calculated average saturation count, and wherein the weighted average saturation count is a result of the performed bit shift operation.

Example 28 includes the subject matter of any of Examples 21-27, and wherein capturing the present value for each of the saturation counters comprises capturing the present value for each of the saturation counters upon a determination that an end of a monitoring window has been reached.

Example 29 includes the subject matter of any of Examples 21-28, and wherein determining whether the end of the monitoring window has been reached comprises determining one of whether a duration of time has elapsed, a maximum number of cycles of one of the one or more processors has been reached, or a maximum number of network packets have been dequeued from one of the plurality of input ports.

Example 30 includes the subject matter of any of Examples 21-29, and further including determining the weighted average saturation count as a function of a weighted average of a most recently calculated average saturation count of the corresponding output buffer queue.

Example 31 includes a network switch comprising a processor; and a memory having stored therein a plurality of instructions that when executed by the processor cause the network switch to perform the method of any of Examples 21-30.

Example 32 includes one or more machine readable storage media comprising a plurality of instructions stored thereon that in response to being executed result in a network switch performing the method of any of Examples 21-30.

Example 33 includes a network switch for adaptive routing using throughput estimation, the network switch comprising means for determining for each output port of a plurality of output ports of the network switch, an occupancy count for each of a plurality of output buffer queues of the corresponding output port, wherein each occupancy count defines a present number of elements in the corresponding output buffer queue; means for incrementing, for each of a corresponding one of the plurality of output buffer queues, a saturation counter in response to a determination that the corresponding one of the plurality of output buffer queues is saturated based on the corresponding occupancy count; means for capturing a present value of each saturation counter upon a determination that an end of a monitoring window has been reached; means for determining, for each output buffer queue, an adjusted average saturation count as a function of the present value of the saturation counter of the corresponding output buffer queue and a weighted average saturation count; means for determining, for each output buffer queue, a running average saturation count for each of the plurality of output buffer queues as a function of the corresponding captured present value and the adjusted average saturation count; means for determining, for each output buffer queue, a congestion rate value, wherein the congestion rate value comprises an arbitrary value mapped to the running average saturation count; and means for determining, for each output buffer queue, a total congestion value as a function of the congestion rate values and a standard occupancy congestion corresponding to a respective one of the plurality of output buffer queues.

Example 34 includes the subject matter of Example 33, and wherein the means for determining the total congestion value for each of the plurality of output buffer queues further comprises means for determining the total congestion value for each of the plurality of output buffer queues as a function of a standard occupancy congestion corresponding to a respective one of the plurality of output buffer queues.

Example 35 includes the subject matter of any of Examples 33 and 34, and wherein the means for determining the total congestion value for each of the plurality of output buffer queues comprises means for (i) determining a weighted congestion rate value as a function of configurable congestion rate weight and the corresponding congestion rate value, (ii) determining a weighted standard occupancy congestion value as a function of a corresponding standard occupancy congestion value and a configurable occupancy weight, and (iii) determining the total congestion value as a sum of the weighted congestion rate value and the weighted standard occupancy congestion value.

Example 36 includes the subject matter of any of Examples 33-35, and further including means for identifying an output buffer queue for each of the plurality of output ports which correspond to one of a plurality of paths usable to forward a network packet to a destination computing device; means for retrieving the total congestion value for each of the output buffer queues of the set of the plurality of output buffer queues; and means for enqueuing the network packet into one of the subset of the plurality of output buffer queues based on the retrieved total congestion values.

Example 37 includes the subject matter of any of Examples 33-36, and wherein the means for enqueuing the network packet into the one of the subset of the plurality of output buffer queues based on the retrieved total congestion values comprises means for enqueuing the network packet into one of the subset of the plurality of output buffer queues based on which of one of the subset of the plurality of output buffer queues has the lowest total congestion value.

Example 38 includes the subject matter of any of Examples 33-37, and wherein the means for determining a congestion rate value for each of the plurality of output buffer queues comprises means for performing a lookup on a translation table, wherein the translation table maps congestion rates to weighted average saturation count values.

Example 39 includes the subject matter of any of Examples 33-38, and further including means for performing a bit shift operation on the most recently calculated average saturation count, and wherein the weighted average saturation count is a result of the performed bit shift operation.

Example 40 includes the subject matter of any of Examples 33-39, and wherein the means for capturing the present value for each of the saturation counters comprises means for capturing the present value for each of the saturation counters upon a determination that an end of a monitoring window has been reached.

Example 41 includes the subject matter of any of Examples 33-40, and wherein the means for determining whether the end of the monitoring window has been reached comprises means for determining one of whether a duration of time has elapsed, a maximum number of cycles of one of the one or more processors has been reached, or a maximum number of network packets have been dequeued from one of the plurality of input ports.

Example 42 includes the subject matter of any of Examples 33-41, and further including means for determining the weighted average saturation count as a function of a weighted average of a most recently calculated average saturation count of the corresponding output buffer queue.

The invention claimed is:

1. A network switch for adaptive routing using throughput estimation, the network switch comprising:
   a plurality of input ports communicatively coupled to a plurality of output ports; and
   a pipeline logic circuit to:
      determine, for each output port, an occupancy count for each of a plurality of output buffer queues of the corresponding output port, wherein each occupancy count defines a present number of elements in the corresponding output buffer queue;
      increment a saturation counter of a corresponding one of the plurality of output buffer queues in response to a determination that the corresponding one of the plurality of output buffer queues is saturated based on the corresponding occupancy count;
      capture a present value of each saturation counter upon a determination that an end of a monitoring window has been reached;
      determine, for each output buffer queue, an adjusted average saturation count as a function of the present value of the saturation counter of the corresponding output buffer queue and a weighted average saturation count;
      determine, for each output buffer queue, a running average saturation count for each of the plurality of output buffer queues as a function of the corresponding captured present value and the adjusted average saturation count;
      determine, for each output buffer queue, a congestion rate value, wherein the congestion rate value comprises an arbitrary value mapped to the running average saturation count; and
      determine, for each output buffer queue, a total congestion value as a function of a corresponding congestion rate value and a standard occupancy congestion corresponding to a respective one of the plurality of output buffer queues.

2. The network switch of claim 1, wherein to determine the total congestion value for each of the plurality of output buffer queues further comprises to determine the total congestion value for each of the plurality of output buffer queues as a function of a standard occupancy congestion corresponding to a respective one of the plurality of output buffer queues.

3. The network switch of claim 2, wherein to determine the total congestion value for each of the plurality of output buffer queues comprises to (i) determine a weighted congestion rate value as a function of configurable congestion rate weight and the corresponding congestion rate value, (ii) determine a weighted standard occupancy congestion value as a function of a corresponding standard occupancy congestion value and a configurable occupancy weight, and (iii) determine the total congestion value as a sum of the weighted congestion rate value and the weighted standard occupancy congestion value.

4. The network switch of claim 1, wherein the pipeline logic circuit is further to:
   identify an output buffer queue for each of the plurality of output ports which correspond to one of a plurality of paths usable to forward a network packet to a destination computing device;
   retrieve the total congestion value for each of the output buffer queues of the set of the plurality of output buffer queues; and
   enqueue the network packet into one of the subset of the plurality of output buffer queues based on the retrieved total congestion values.

5. The network switch of claim 4, wherein to enqueue the network packet into the one of the subset of the plurality of output buffer queues based on the retrieved total congestion values comprises to enqueue the network packet into one of the subset of the plurality of output buffer queues based on which of one of the subset of the plurality of output buffer queues has the lowest total congestion value.

6. The network switch of claim 1, wherein to determine a congestion rate value for each of the plurality of output buffer queues comprises to perform a lookup on a translation table, wherein the translation table maps congestion rates to weighted average saturation count values.

7. The network switch of claim 1, wherein the pipeline logic circuit is further to perform a bit shift operation on the most recently calculated average saturation count, and wherein the weighted average saturation count is a result of the performed bit shift operation.

8. The network switch of claim 1, wherein to capture the present value for each of the saturation counters comprises to capture the present value for each of the saturation counters upon a determination that an end of a monitoring window has been reached.

9. The network switch of claim 8, wherein to determine whether the end of the monitoring window has been reached comprises to determine one of whether a duration of time has elapsed, a maximum number of cycles of one of the one or more processors has been reached, or a maximum number of network packets have been dequeued from one of the plurality of input ports.

10. The network switch of claim 1, wherein the pipeline logic circuit is further to determine the weighted average saturation count as a function of a weighted average of a most recently calculated average saturation count of the corresponding output buffer queue.

11. One or more non-transitory, computer-readable storage media comprising a plurality of instructions stored thereon that in response to being executed cause a network switch to:
  determine, for each of a plurality of output ports of the network switch communicatively coupled to a plurality of input ports of the network switch, an occupancy count for each of a plurality of output buffer queues of the corresponding output port, wherein each occupancy count defines a present number of elements in the corresponding output buffer queue;
  increment a saturation counter of a corresponding one of the plurality of output buffer queues in response to a determination that the corresponding one of the plurality of output buffer queues is saturated based on the corresponding occupancy count;
  capture a present value of each saturation counter upon a determination that an end of a monitoring window has been reached;
  determine, for each output buffer queue, an adjusted average saturation count as a function of the present value of the saturation counter of the corresponding output buffer queue and a weighted average saturation count;
  determine, for each output buffer queue, a running average saturation count for each of the plurality of output buffer queues as a function of the corresponding captured present value and the adjusted average saturation count;
  determine, for each output buffer queue, a congestion rate value, wherein the congestion rate value comprises an arbitrary value mapped to the running average saturation count; and
  determine, for each output buffer queue, a total congestion value as a function of a corresponding congestion rate value and a standard occupancy congestion corresponding to a respective one of the plurality of output buffer queues.

12. The one or more non-transitory, computer-readable storage media of claim 11, wherein to determine the total congestion value for each of the plurality of output buffer queues further comprises to determine the total congestion value for each of the plurality of output buffer queues as a function of a standard occupancy congestion corresponding to a respective one of the plurality of output buffer queues.

13. The one or more non-transitory, computer-readable storage media of claim 12, wherein to determine the total congestion value for each of the plurality of output buffer queues comprises to (i) determine a weighted congestion rate value as a function of configurable congestion rate weight and the corresponding congestion rate value, (ii) determine a weighted standard occupancy congestion value as a function of a corresponding standard occupancy congestion value and a configurable occupancy weight, and (iii) determine the total congestion value as a sum of the weighted congestion rate value and the weighted standard occupancy congestion value.

14. The one or more non-transitory, computer-readable storage media of claim 11, wherein the plurality of instructions further cause the network switch to:
  identify an output buffer queue for each of the plurality of output ports which correspond to one of a plurality of paths usable to forward a network packet to a destination computing device;
  retrieve the total congestion value for each of the output buffer queues of the set of the plurality of output buffer queues;
  determine a corresponding one of the subset of the plurality of output buffer queues based on the retrieved total congestion values; and
  enqueue the network packet into the determined one of the subset of the plurality of output buffer queues.

15. The one or more non-transitory, computer-readable storage media of claim 14, wherein to enqueue the network packet into the one of the subset of the plurality of output buffer queues based on the retrieved total congestion values comprises to enqueue the network packet into one of the subset of the plurality of output buffer queues based on which of one of the subset of the plurality of output buffer queues has the lowest total congestion value.

16. The one or more non-transitory, computer-readable storage media of claim 11, wherein to determine a congestion rate value for each of the plurality of output buffer queues comprises to perform a lookup on a translation table, wherein the translation table maps congestion rates to weighted average saturation count values.

17. The one or more non-transitory, computer-readable storage media of claim 11, wherein the plurality of instructions further cause the network switch to perform a bit shift operation on the most recently calculated average saturation count, and wherein the weighted average saturation count is a result of the performed bit shift operation.

18. The one or more non-transitory, computer-readable storage media of claim 11, wherein to capture the present value for each of the saturation counters comprises to capture the present value for each of the saturation counters upon a determination that an end of a monitoring window has been reached.

19. The one or more non-transitory, computer-readable storage media of claim 18, wherein to determine whether the end of the monitoring window has been reached comprises to determine one of whether a duration of time has elapsed, a maximum number of cycles of one of the one or more processors has been reached, or a maximum number of network packets have been dequeued from one of the plurality of input ports.

20. The one or more non-transitory, computer-readable storage media of claim 11, wherein the plurality of instructions further cause the network switch to determine the weighted average saturation count as a function of a weighted average of a most recently calculated average saturation count of the corresponding output buffer queue.

21. A network switch for adaptive routing using throughput estimation, the network switch comprising:
    circuitry to determine for each output port of a plurality of output ports of the network switch, an occupancy count for each of a plurality of output buffer queues of the corresponding output port, wherein each occupancy count defines a present number of elements in the corresponding output buffer queue;
    circuitry to increment, for each of a corresponding one of the plurality of output buffer queues, a saturation counter in response to a determination that the corresponding one of the plurality of output buffer queues is saturated based on the corresponding occupancy count;
    circuitry to capture a present value of each saturation counter upon a determination that an end of a monitoring window has been reached;
    circuitry to determine, for each output buffer queue, an adjusted average saturation count as a function of the present value of the saturation counter of the corresponding output buffer queue and a weighted average saturation count;
    circuitry to determine, for each output buffer queue, a running average saturation count for each of the plurality of output buffer queues as a function of the corresponding captured present value and the adjusted average saturation count;
    circuitry to determine, for each output buffer queue, a congestion rate value, wherein the congestion rate value comprises an arbitrary value mapped to the running average saturation count; and
    circuitry to determine, for each output buffer queue, a total congestion value as a function of the congestion rate values and a standard occupancy congestion corresponding to a respective one of the plurality of output buffer queues.

22. The network switch of claim 21, wherein the circuitry to determine the total congestion value for each of the plurality of output buffer queues further comprises circuitry to determine the total congestion value for each of the plurality of output buffer queues as a function of a standard occupancy congestion corresponding to a respective one of the plurality of output buffer queues.

23. The network switch of claim 22, wherein the circuitry to determine the total congestion value for each of the plurality of output buffer queues comprises circuitry to determine (i) a weighted congestion rate value as a function of configurable congestion rate weight and the corresponding congestion rate value, (ii) a weighted standard occupancy congestion value as a function of a corresponding standard occupancy congestion value and a configurable occupancy weight, and (iii) the total congestion value as a sum of the weighted congestion rate value and the weighted standard occupancy congestion value.

24. The network switch of claim 21, further comprising:
    circuitry to identify an output buffer queue for each of the plurality of output ports which correspond to one of a plurality of paths usable to forward a network packet to a destination computing device;
    circuitry to retrieve the total congestion value for each of the output buffer queues of the set of the plurality of output buffer queues; and
    circuitry to enqueue the network packet into one of the subset of the plurality of output buffer queues based on the retrieved total congestion values.

25. The network switch of claim 24, wherein the circuitry to enqueue the network packet into the one of the subset of the plurality of output buffer queues based on the retrieved total congestion values comprises circuitry to enqueue the network packet into one of the subset of the plurality of output buffer queues based on which of one of the subset of the plurality of output buffer queues has the lowest total congestion value.

* * * * *